March 13, 1951     E. W. KEENEY, SR     2,544,926
FISHERMAN'S NET
Filed Feb. 26, 1948
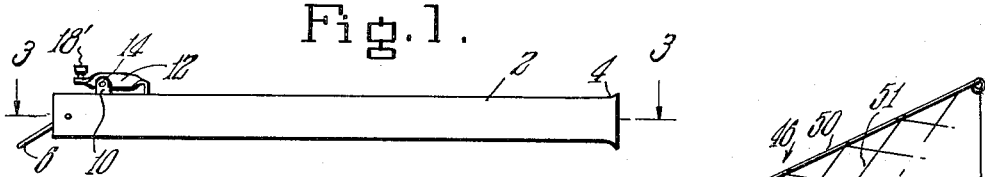
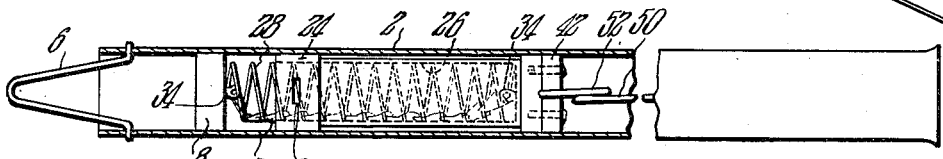
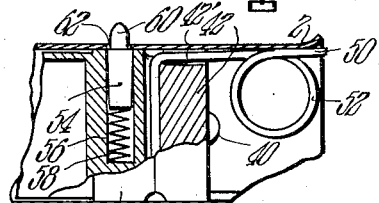
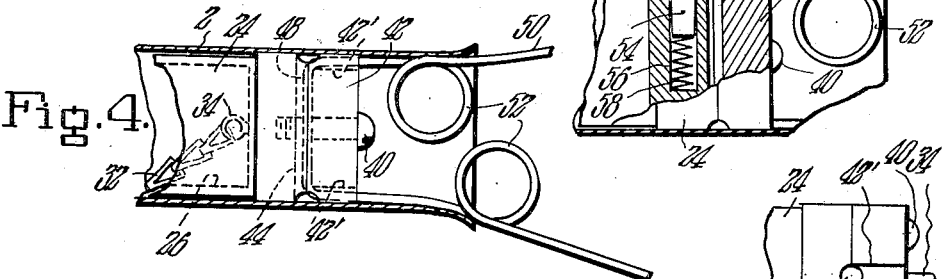
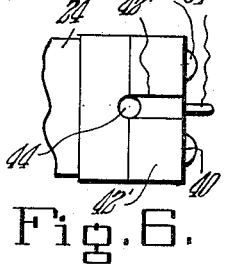
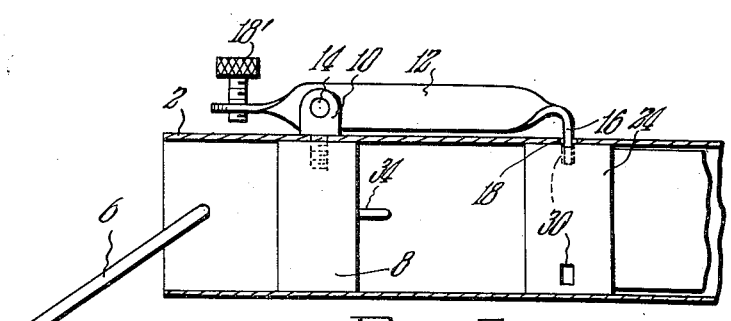
INVENTOR.
BY Edward W. Keeney
Walter C. Ross
Attorney Patented Mar. 13, 1951

2,544,926

UNITED STATES PATENT OFFICE 2,544,926

FISHERMAN'S NET

Edward W. Keeney, Sr., Westfield, Mass.

Application February 26, 1948, Serial No. 11,112

3 Claims. (Cl. 43—12)

This invention relates to improvements in a fisherman's net.

The principal objects of the invention are directed to the provision of net apparatus for fishermen which is characterized by a holder in which a net may be disposed for carrying and other purposes and which may be instantly projected therefrom for use by a fisherman.

The construction of the invention is simple in form, rugged and efficient in operation and is accomplished by a novel combination and arrangement of parts as will hereinafter appear.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a net device embodying certain novel features of the invention;

Fig. 2 is a plan view of the device shown in Fig. 1 with the net distended in operative position;

Fig. 3 is an enlarged partial longitudinal sectional view through the casing showing the parts therein taken along the line 3—3 in Fig. 1;

Fig. 4 is a similar view at the outer or forward end of the device;

Fig. 5 is a partial longitudinal sectional view at the inner or rear end of the device with the actuating and limiting means omitted for clearness;

Fig. 6 is a partial elevational view of the propeller of the device; and

Fig. 7 is a view similar to that of Fig. 4 showing a different form of the invention.

Referring now to the drawings more in detail, the invention will be fully described.

A casing 2 is provided which is tubular in form and has a flaring outer or forward end 4. A bail 6 is pivoted in the inner or rear end of the casing and may be used for various purposes.

An abutment 8 is secured in the casing by any convenient means and has a pivot member 10 in screw threaded engagement therewith, as shown in Fig. 5.

A lock 12 is pivoted at 14 to the member 10 and has a catch part 16 which extends through a slot 18 in the casing 2.

An adjusting screw 18' is in screw threaded engagement with the member 12 and is adapted to be screwed inwardly to abut the casing and prevent the part 16 of the lock from being moved outwardly.

A propeller 24 is reciprocable in the casing 2 and is provided with a bore 26 which is open at its end adjacent the member 8. A spring 28 is disposed in the bore 26 and abuts the member 8 and is arranged and constructed to urge the propeller forwardly or outwardly of the casing for providing the operative position of the net.

In the rear or cocked position of the propeller 24, the part 16 of the lock 12 engages in one of a plurality of openings 30 provided in the said propeller. The lock may be manually engaged to disengage the lock part so that the propeller is moved forwardly by the spring.

A flexible limiter 32, which may be in the form of a chain or the like, has its opposite ends connected to eyes 34 or the like which are secured to the members 8 and 24. The member 32 limits movement of the propeller 24 outwardly relative to the casing.

A cap 42 is secured to the outer end of member 24 by means of screws 40 or the like. The cap is provided with grooves such as 42' and a hole 44 is provided between the said cap and member 24.

A net support 46 is preferably made from wire of sufficient strength to support a net while at the same time it is resilient or springlike. An intermediate portion 48 of the net support extends through the hole 44 and side arms 50 extend therefrom. The side arms 50 are provided with loops 52 adjacent the outer end of member 24.

A net of usual form indicated in part by 51 is secured to the arms 50 of the net support so as to connect the outer ends of the members 50 and 50. The arms 50 of the net support may be brought together against their natural spreading apart tendency. The propeller is moved rearwardly of the casing thereby and the net and arms are inserted into the flaring outer end of the casing.

The lock 12 has its catch part 16 in engagement with an opening 30 of member 24. In this way the member 24 is releasably locked in its cocked position. When the lock 12 is manipulated so as to release the propeller 24 it is urged forwardly or outwardly of the casing by the spring so that the arms may assume their distended open diverging position in which the net is supported in open relation for its function, the casing providing a handle therefor.

The casing may be made of lightweight material such as aluminum or the like and the other parts may be made from such materials as will provide a lightweight, strong and durable device.

As will be observed, the propeller is releasably held in cocked position with the arms and net within the casing. The lock device may be arranged so that it is locked against releasing movement whereby the propeller will not be unintentionally released.

When the propeller is released so as to be moved outwardly and forwardly of the casing the arms of the net support are opened into net supporting position while the propeller is limited in its forward movement by the means provided therefor.

Altogether there is provided a compact efficient device in which the net and supporting elements are either concealed and protected or presented for the use thereof intended.

According to the form of the invention shown in Fig. 7, a locking member has a body 54 slidable in a socket 56 of the member 24. A spring 58 urges the body outwardly and a manually engageable part 60 extends outwardly from the body through one of a plurality of openings 62 in member 2.

The member 24 is in rear position in Fig. 7. To release the member and net arms the member 60 is depressed.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A net device of the class described comprising in combination, an elongated cylindrical casing having rear and forward ends, an abutment secured in the casing adjacent the rear end thereof, an elongated propeller, provided with a recess slidable in said casing forwardly of said abutment between a rear and forward net projecting positions, said propeller being provided with a bore having an open end directed towards said abutment and a closed forward end, a spring in the bore of said propeller between the forward closed end thereof and said abutment for sliding said propeller forwardly to net projecting position, a lock member swingable over said abutment having a portion which is receivable in said recess in said propeller to releasably hold said propeller in rear position, a flexible restraining member having opposite ends secured to said abutment and forward end of the propeller adapted to limit forward movement of the latter to net projecting position, a cap in said casing forwardly of and secured to the forward end of said propeller, said cap provided with grooves on opposite sides thereof and said cap and forward end of the propeller on adjacent faces thereof provided with complemental grooves in communication with said first-named groove, a net support consisting of a single length of spring wire having an intermediate portion disposed in the said complemental grooves and arms extending forwardly therefrom with loops therein adjacent said cap, and a net secured to said arm portions, all adapted and arranged whereby with the propeller in forward position the arms of the net support relatively diverge forwardly of the forward end of said casing.

2. A net device of the class described comprising in combination, an elongated cylindrical casing having rear and forward ends, an abutment secured in the casing adjacent the rear end thereof, an elongated propeller slidable in said casing between rear and net projecting positions provided with an axial bore open at its rear end adjacent said abutment and closed at its forward end, a flexible restraining member having opposite ends secured to said abutment and closed end of the propeller to limit forward movements thereof, a spring in the bore of the propeller between the closed end thereof and said abutment for urging the said propeller forwardly in the casing, releasable locking means engageable with the propeller for releasably holding it in rear position, a net support formed from a single length of spring wire to have an intermediate portion and arms extending therefrom which are provided with loops adjacent said intermediate portion, means securing said intermediate portion to the forward end of said propeller, and a net secured to said arms adapted to be received in said casing when the propeller is in rear position therein, the arms of said net support being adapted to assume a diverging net supporting relation when the propeller is in net projecting position, said securing means including a cap secured to the forward end of said propeller each provided with grooves in which said intermediate portion is disposed.

3. A net device of the class described comprising in combination, an elongated cylindrical casing having rear and forward ends, an abutment secured in the casing adjacent the rear end thereof, an elongated propeller slidable in said casing between rear and net projecting position provided with an axial bore open at its rear end adjacent said abutment and closed at its forward end, a flexible restraining member having opposite ends secured to said abutment and closed end of the propeller to limit forward movements thereof, a spring in the bore of the propeller between the closed end thereof and said abutment for urging the said propeller forwardly in the casing, releasable locking means engageable with the propeller for releasably holding it in rear position, a net support formed from a single length of spring wire to have an intermediate portion and arms extending therefrom which are provided with loops adjacent said intermediate portion, means securing said intermediate portion to the forward end of said propeller, and a net secured to said arms adapted to be received in said casing when the propeller is in rear position therein, the arms of said net support being adapted to assume a diverging net supporting relation when the propeller is in net projecting position.

EDWARD W. KEENEY, Sr.

REFERENCES CITED

The following references are of record in the file of this patent:

UNITED STATES PATENTS

| Number | Name | Date |
|---|---|---|
| 94,119 | Kirk | Aug. 24, 1869 |
| 533,061 | Hilton | Jan. 29, 1895 |
| 843,339 | Hopkins | Feb. 5, 1907 |
| 985,114 | Covell | Feb. 21, 1911 |
| 986,761 | Roscoe | Mar. 14, 1911 |
| 1,077,481 | Levy | Nov. 4, 1913 |
| 2,245,993 | McCoy | June 17, 1941 |
| 2,293,800 | Brown | Aug. 25, 1942 |